United States Patent
Parihar et al.

(10) Patent No.: US 10,805,876 B1
(45) Date of Patent: Oct. 13, 2020

(54) SELECTING A BACKHAUL CARRIER FOR A RELAY NODE

(71) Applicant: Sprint Spectrum LP, Overland Park, KS (US)

(72) Inventors: Vanil Parihar, Overland Park, KS (US); Rashmi Kumar, Herndon, VA (US); Nitesh Manchanda, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/421,764

(22) Filed: May 24, 2019

(51) Int. Cl.
| | | |
|---|---|---|
| H04W 48/18 | (2009.01) | |
| H04W 72/04 | (2009.01) | |
| H04W 92/10 | (2009.01) | |
| H04W 88/14 | (2009.01) | |
| H04L 27/26 | (2006.01) | |
| H04W 60/00 | (2009.01) | |

(52) U.S. Cl.
CPC ......... *H04W 48/18* (2013.01); *H04L 27/2607* (2013.01); *H04W 60/00* (2013.01); *H04W 72/0453* (2013.01); *H04W 88/14* (2013.01); *H04W 92/10* (2013.01)

(58) Field of Classification Search
CPC ..... H04W 48/18; H04W 60/00; H04W 72/02; H04W 72/04; H04W 72/0453; H04W 88/14; H04W 92/10; H04L 27/2607
See application file for complete search history.

(56) References Cited

U.S. PATENT DOCUMENTS

| | | | | |
|---|---|---|---|---|
| 2011/0103294 A1* | 5/2011 | Liu | ....................... | H04W 76/15 370/315 |
| 2011/0170471 A1* | 7/2011 | Dahlman | .......... | H04W 72/0446 370/312 |
| 2012/0028627 A1* | 2/2012 | Hunzinger | ...... | H04W 36/00837 455/422.1 |
| 2012/0184204 A1* | 7/2012 | Kazmi | ............... | H04B 7/15542 455/7 |
| 2012/0300654 A1* | 11/2012 | Gan | .................... | H04L 25/0202 370/252 |
| 2012/0307715 A1* | 12/2012 | Maeda | ............... | H04B 7/15507 370/315 |
| 2013/0190000 A1* | 7/2013 | Boudreau | ............. | H04W 16/26 455/449 |
| 2015/0155930 A1* | 6/2015 | Liu | .................... | H04B 7/15557 455/452.1 |
| 2017/0208574 A1* | 7/2017 | Ramakrishna | ........ | H04W 40/22 |
| 2018/0049067 A1 | 2/2018 | He et al. | | |

* cited by examiner

*Primary Examiner* — Candal Elpenord

(57) ABSTRACT

Systems, methods, and processing nodes for selecting a backhaul carrier for a relay node including instructing the relay node to attempt to attach to a guard band associated with a carrier that shares a characteristic of the preferred backhaul carrier. The characteristic can include a channel size threshold or a threshold frequency. A numerology of a communication channel within the guard band may be adjusted to enable the relay node to communicate with a donor access node using the guard band.

19 Claims, 9 Drawing Sheets

SELECTING A BACKHAUL CARRIER FOR A RELAY NODE

TECHNICAL BACKGROUND

As wireless networks evolve and grow, there are ongoing challenges in providing high-quality service to increasing numbers of wireless devices in various coverage areas of a wireless network. One approach to improving service quality and coverage is to implement relay nodes for relaying communication between a base station or donor access node, and an end-user wireless device. Combinations of wireless devices designated as relays (henceforth, "relay wireless devices") that are co-located with relay access points may be used at the edge of a coverage area of a donor access node to improve coverage and/or service, as well as in crowded areas having a high number of other wireless devices to increase the available throughput to the end-user wireless devices being relayed.

However, relay nodes may be limited in their ability to effectively service wireless devices that are attached to it, particularly if there are problems with a default or preferred backhaul connection between the relay node and the donor access node. For example, a backhaul connection on a carrier between the donor access node and the relay node may become compromised due to interference. Alternatively or in addition, the relay node may be unable to connect or reconnect to the default or preferred carrier after being disconnected. Typically, in these cases, relay nodes are instructed to scan for other carriers to which they can connect. However, these other carriers may be reserved for communication with standard or end-user wireless devices and may not be able to maintain a throughput or QoS required for the relay node. Further, as wireless frequency bands become more congested, relay nodes attaching to other carriers can cause a reduced throughput for other wireless devices attached to the same carriers.

OVERVIEW

Exemplary embodiments described herein include systems, methods, and processing nodes for selecting a backhaul carrier for a relay node. An exemplary method for selecting a backhaul carrier for a relay node includes determining that the relay node is unable to attach to a preferred backhaul carrier and instructing the relay node to attempt to attach to a guard band associated with a carrier that shares a characteristic of the preferred backhaul carrier.

An exemplary system for selecting a backhaul carrier for a relay node includes a processing node, and a processor coupled to the processing node. The processor can be configured to perform operations including determining that a relay node is unable to connect to a default backhaul carrier in a wireless network, wherein the default backhaul carrier has a channel size that meets a threshold channel size. The operations further include identifying an available guard band to which the relay node can connect and instructing the relay node to attempt a connection to the available guard band.

An exemplary processing node for selecting a backhaul carrier for a relay node can be configured to perform operations including identifying an available guard band to which a relay node can connect, the available guard band being associated with one or more carriers deployed by one or more donor access nodes, the one or more carriers having channel sizes that meet a threshold channel size, and instructing the relay node to prioritize attempts to attach to the available guard band over attempts to attach to other carriers having channel sizes that do not meet the threshold channel size. Upon being unable to connect to a preferred carrier for any reason, the relay node attempts to connect to the available guard band prior to attempting to connect to any of the other carriers.

DETAILED DESCRIPTION

Figure 1:
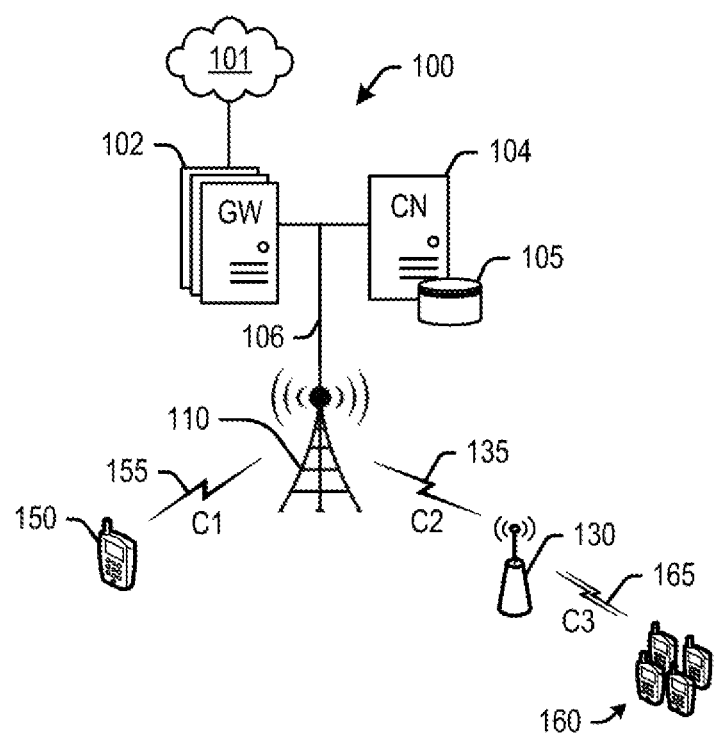
FIG. 1 depicts an exemplary system for selecting a backhaul carrier for a relay node.

Exemplary embodiments described herein include systems, methods, and processing nodes for selecting a backhaul carrier for a relay node, when a primary, preferred, or default carrier becomes unavailable for any reason. An exemplary method for selecting a backhaul carrier for a relay node includes determining that the relay node is unable to attach to a preferred backhaul carrier and instructing the relay node to attempt to attach to a guard band associated with a carrier that shares a characteristic of the preferred backhaul carrier. The primary, preferred, or default carrier (hereinafter, default carrier) may be deployed by one or more access nodes within a communication range of the relay node. For example, an access node deploying the default carrier may be a macrocell access node, such as an eNodeB. Further, the relay node can be configured to relay data between the access node and one or more end-user wireless devices attached to the relay node. Thus, the relay node may be a small cell access node, a home eNodeB, etc. In an exemplary embodiment, the relay node includes a relay wireless device coupled to a relay access point and is configured to relay data packets between the access node and an end-user wireless device attached to the relay access point. Thus, the access node may be referred to as a donor access node.

Further, the characteristic of the default backhaul carrier can include a channel size threshold. In other words, the default or preferred backhaul carrier is configured with a channel size that meets or exceeds a minimum channel size threshold, enabling a minimum quality of service for the plurality of end-user wireless devices attached to the relay node. In an exemplary embodiment, the minimum channel size threshold comprises 20 MHz. Thus, the guard band of a 20 MHz channel can generally provide greater bandwidth than a guard band of a carrier with a more narrow bandwidth, such as 10 MHz or 5 MHz. Consequently, instructing the relay node to attempt to attach to the guard band associated with a carrier that shares the characteristic of the preferred backhaul carrier comprises: instructing the relay node to attempt to attach to the guard band of a carrier that utilizes a channel size that meets the channel size threshold. In other words, when the relay node is disconnected from the default carrier for any reason, the relay node is instructed to attempt to attach to a guard band of any carrier having a channel size that meets or exceeds the minimum channel size threshold. In an exemplary embodiment, the relay node can reattach to a guard band of the default carrier itself. In other words, when the relay node is unable to connect or reconnect to the default carrier, the relay node attempts to attach to the guard band of the default carrier prior to attempts to attach to any other carrier. In another exemplary embodiment, the relay node can attach to a guard band of another carrier that also has a sufficiently-large channel size, prior to attempts to attach to any other carrier.

Further, the characteristic of the default backhaul carrier can include a threshold frequency. In other words, a frequency utilized by the default backhaul carrier is sufficient to provide a minimum quality of service for a plurality of wireless devices attached to the relay node. Such high frequencies are useful, for example, in densely populated areas, where relay nodes are more likely to be deployed. In this embodiment, instructing the relay node to attempt to attach to the guard band associated with a carrier that shares the characteristic of the preferred backhaul carrier can include instructing the relay node to attempt to attach to the guard band of a carrier that utilizes a frequency above the threshold frequency. In other words, when the relay node is disconnected from the default carrier for any reason, the relay node is instructed to attempt to attach to a guard band of any carrier utilizing a frequency that meets or exceeds the minimum frequency threshold. In an exemplary embodiment, the relay node can reattach to a guard band of the default carrier itself. In another exemplary embodiment, the relay node can attach to a guard band of another carrier that also utilizes an above-threshold frequency. In another exemplary embodiment, the relay node can be instructed to attach to a guard band of any TDD carrier over a guard band of any other carrier.

In exemplary embodiments described herein, a numerology of a communication channel within the guard band may be adjusted to enable the relay node to communicate with a donor access node using the guard band. For example, in a 5G New Radio (NR) system, adjusting a numerology of a communication channel can include adjusting a subcarrier spacing, a number of slots, a number of symbols per slot, a frame configuration of uplink and downlink slots per subframe, and configuring different bandwidth parts (BWPs) with different numerologies. For example, the subcarrier spacing scales by $2\mu \times 15$ kHz to cover different services: QoS, latency requirements and frequency ranges. 15 kHz, 30 kHz, and 60 kHz subcarrier spacing are used for the lower frequency bands, and 60 kHz, 120 kHz, and 240 kHz subcarrier spacing are used for the higher frequency bands. In addition, a number of slots increases as numerology ($\mu$) increases. Similar to LTE, each frame in 5GNR has a duration of 10 ms, with each subframe having a 1 ms duration, with ten subframes to a frame. Given a default cyclic prefix (CP), each slot has 14 symbols. As the numerology increases, the number of slots in a subframe increase, therefore increasing the number of symbols sent in a given time. Further, whereas a standard slot has 14 OFDM symbols, "mini-slots" can contain 7, 4, or 2 OFDM symbols. Mini-slots can also start immediately without needing to wait for slot boundaries, enabling quick delivery of low-latency payloads. Mini-slots are not only useful for low-latency applications, but they also play an important role in LTE-NR coexistence and beamforming. Further, the NR slot structure allows for dynamic assignment of the link direction (i.e. uplink or downlink) in each OFDM symbol within the slot. With this, the network can dynamically balance UL and DL traffic. This can be used to optimize traffic for different service types. Finally, different numerologies may be multiplexed within a single carrier using BWPs. In an exemplary embodiment, adjusting the numerology comprises obtaining an available bandwidth of the guard band, and adjusting the numerology based on the available bandwidth of the guard band. For example, the guard band may have a configurable bandwidth that is approximately 10% or more of the total channel bandwidth of the carrier associated therewith. Thus, a subcarrier spacing, or other characteristic of the numerology may be adjusted to accommodate for the bandwidth of the guard band.

In another exemplary embodiment, a system for selecting a backhaul carrier for a relay node includes a processing node, and a processor coupled to the processing node. The processing node may be communicatively coupled to, for instance, a donor access node, a relay node, a controller node, or any other network node. The processor can be configured to perform operations including determining that a relay node is unable to connect to a default backhaul carrier in a wireless network. The relay node is configured to relay data between one or more donor access nodes and one or more end-user wireless devices attached to the relay node, and the default backhaul carrier is deployed by the one or more donor access nodes. Further, the default backhaul carrier has a channel size that meets a threshold channel size. The operations further include identifying an available guard band to which the relay node can connect. The available guard band may be associated with one or more carriers deployed by at least one of the one or more donor access nodes. The one or more carriers can have channel sizes that meet the threshold channel size. The operations can further include instructing the relay node to attempt a connection to the available guard band.

The connection can be enabled by defining a communication channel on the guard band and instructing the relay node to attempt a connection to the communication channel. In an exemplary embodiment, the communication channel includes a 5G communication channel, and the operations further include determining a subcarrier spacing for the communication channel that enables the relay node to communicate with the at least one donor access node via the 5G communication channel. Other aspects of the numerology of the communication channel can be adjusted to enable the relay node to attach to the communication channel in the guard band, such as a number of slots, a number of symbols per slot, a frame configuration of uplink and downlink slots per subframe and configuring different bandwidth parts (BWPs) with different numerologies.

Further, in an exemplary embodiment, the default backhaul carrier is among the one or more carriers, and the available guard band is on either side of the default backhaul carrier. Alternatively or in addition, the available guard band is associated with another carrier from the one or more carriers, said another carrier being different from the default backhaul carrier. In some exemplary embodiments, the operations further include instructing the relay node to prioritize attempting the connection to the guard band over attempting to attach to other backhaul carriers.

In another exemplary embodiment, a processing node can be configured to perform operations including identifying an available guard band to which a relay node can connect, the available guard band being associated with one or more carriers deployed by one or more donor access nodes, the one or more carriers having channel sizes that meet a threshold channel size, and instructing the relay node to prioritize attempts to attach to the available guard band over attempts to attach to other carriers having channel sizes that do not meet the threshold channel size. Upon being unable to connect to a preferred carrier for any reason, the relay node attempts to connect to the available guard band prior to attempting to connect to any of the other carriers. The instructions can further include instructing a donor access node to deploy a communication channel on the available guard band to which the relay node can attach. For example, the communication channel can be a 5G communication channel with a flexible numerology, as described herein. These and other embodiments are further described herein and with reference to FIGS. 1-10.

FIG. 1 depicts an exemplary system for selecting a backhaul carrier for a relay node. System 100 comprises a communication network 101, gateway 102, controller node 104, access node 110, relay node 130, and end-user wireless devices 150 and 160. In this exemplary embodiment, access node 110 may be a macrocell access node configured to deploy one or more carriers C1 and C2. Each carrier C1 and C2 may be configured to utilize a different frequency band or sub-band, a different operating mode such as 4G LTE or 5G NR, a different channel size or bandwidth, and so on. Furthermore, carriers C1 and C2 may be deployed using different types of multiplexing modes, such as FDD, TDD, etc. In other embodiments, any other combination of macrocell access nodes, relay nodes, and carriers deployed therefrom may be evident to those having ordinary skill in the art in light of this disclosure.

Wireless device 150 is illustrated as being in direct communication with access node 110 over a communication link 155 utilizing carrier C1, and relay node 130 is illustrated as being in direct communication with access node 110 over a communication link 135 utilizing carrier C2. Communication link 135 may hereinafter be referred to as a backhaul link. Further, relay node 130 may be configured to deploy another carrier C3, which may utilize the same or different frequency, operating mode, or channel bandwidth than carriers C1 or C2. Thus, wireless devices 160 are illustrated as being in direct communication with relay node 130 over communication links 165 utilizing carrier C3, with relay node 130 being configured to relay data packets between wireless devices 160 and access node 110. Consequently, access node 110 may be termed a "donor" access node. Thus, wireless devices 160 may access network services using the combination of relay node 130 and wireless backhaul link 135 rather than directly connecting to (and potentially overloading) donor access node 110, which may be serving numerous other devices (such as wireless device 150, among others not shown). Moreover, wireless devices among wireless devices 160 that are outside a coverage area of donor access node 110 may access network services from donor access node 110 by virtue of being connected to relay node 130.

Further, as described herein, a processing node communicatively coupled to one or both of access node 110 and relay node 130 may be configured to select a backhaul carrier for relay node 130, when a primary, preferred, or default carrier (for example, carrier C2) becomes unavailable for any reason. For example, if it is determined that relay node 130 is disconnected from backhaul link 135 and is unable to attach to carrier C2 for any reason, then relay node 130 is instructed to attempt to attach to a guard band associated with a carrier that shares a characteristic of the preferred or default backhaul link 135. The characteristic of carrier C2 (on which backhaul link 135 was configured) can include a channel size threshold. For example, carrier C2 may be configured with a channel size that meets or exceeds a minimum channel size threshold, enabling a minimum quality of service for the plurality of end-user wireless devices 160 attached to the relay node 130. In an exemplary embodiment, the minimum channel size threshold comprises 20 MHz. Thus, the guard band of a 20 MHz channel can generally provide greater bandwidth than a guard band of a carrier with a more narrow bandwidth, such as 10 MHz or 5 MHz. For example, carrier C1 may be configured with a narrow channel bandwidth, such as 5 MHz. Consequently, instructing the relay node 130 to attempt to attach to the guard band associated with a carrier that shares the characteristic of the preferred backhaul carrier comprises instructing the relay node 130 to attempt to attach to the guard band of a carrier that utilizes a channel size that meets the channel size threshold. In other words, when the relay node 130 is disconnected from the default backhaul link 135 for any reason, the relay node 130 is instructed to attempt to attach to a guard band of any carrier having a channel size that meets or exceeds the minimum channel size threshold. In an exemplary embodiment, the relay node 130 can reattach to a guard band of the default carrier itself. In other words, when the relay node is unable to connect or reconnect to carrier C2, the relay node attempts to attach to the guard band of the carrier C2 prior to attempts to attach to any other carrier. In another exemplary embodiment, the relay node can attach to a guard band of another carrier that also has a sufficiently-large channel size, prior to attempts to attach to any other carrier. For example, if carrier C1 was configured with at least the threshold channel bandwidth, then relay node 130 would attempt to attach to a guard band of carrier C1, before any attempts to attach to C1 itself. Such an instruction can include instructing the relay node 130 to scan for the guard bands of carriers C2 and C1 prior to scanning for the carrier C1.

Further, the characteristic of the default backhaul link 135 can include a threshold frequency. In other words, a frequency utilized by the carrier C2 is sufficient to provide a minimum quality of service for plurality of wireless devices 160 attached to the relay node 130. Such high frequencies are useful, for example, in densely populated areas, where relay nodes are more likely to be deployed. In this embodiment, instructing the relay node 130 to attempt to attach to the guard band associated with a carrier that shares the characteristic of carrier C2 can include instructing the relay node 130 to attempt to attach to the guard band of a carrier that utilizes a frequency above the threshold frequency. In other words, when the relay node 130 is disconnected from the default backhaul link 135 for any reason, the relay node 130 is instructed to attempt to attach to a guard band of any carrier utilizing a frequency that meets or exceeds the minimum frequency threshold. In an exemplary embodiment, the minimum frequency threshold is 2.5 GHz. Further, in an exemplary embodiment, the relay node 130 can reattach to a guard band of the default carrier itself, e.g. carrier C2. In another exemplary embodiment, the relay node can attach to a guard band of another carrier that also utilizes an above-threshold frequency. For example, if carrier C1 was configured to utilize a frequency of at least 2.5 GHz, then relay node 130 is instructed to scan for a guard band of carrier C1 prior to scanning for any other carrier or guard band. In another exemplary embodiment, the relay node 130 can be instructed to attach to a guard band of any TDD carrier over a guard band of any other carrier.

In exemplary embodiments described herein, a numerology of a communication channel within the guard band may be adjusted to enable the relay node 130 to communicate with donor access node 110 using the guard band. For example, in a 5G New Radio (NR) system, adjusting a numerology of a communication channel on, for example, carrier C2, can include adjusting a subcarrier spacing, a number of slots, a number of symbols per slot, a frame configuration of uplink and downlink slots per subframe, and configuring different bandwidth parts (BWPs) with different numerologies. For example, the subcarrier spacing scales by $2\mu \times 15$ kHz to cover different services: QoS, latency requirements and frequency ranges. 15 kHz, 30 kHz, and 60 kHz subcarrier spacing are used for the lower frequency bands, and 60 kHz, 120 kHz, and 240 kHz subcarrier spacing are used for the higher frequency bands. In addition, a number of slots increases as numerology ($\mu$) increases. Similar to LTE, each frame in 5GNR has a duration of 10 ms, with each subframe having a 1 ms duration, with ten subframes to a frame. Given a default cyclic prefix (CP), each slot has 14 symbols. As the numerology increases, the number of slots in a subframe increase, therefore increasing the number of symbols sent in a given time. Further, whereas a standard slot has 14 OFDM symbols, "mini-slots" can contain 7, 4, or 2 OFDM symbols. Mini-slots can also start immediately without needing to wait for slot boundaries, enabling quick delivery of low-latency payloads. Mini-slots are not only useful for low-latency applications, but they also play an important role in LTE-NR coexistence and beamforming. Further, the NR slot structure allows for dynamic assignment of the link direction (i.e. uplink or downlink) in each OFDM symbol within the slot. With this, the network can dynamically balance UL and DL traffic. This can be used to optimize traffic for different service types. Finally, different numerologies may be multiplexed within a single carrier using BWPs. In an exemplary embodiment, adjusting the numerology comprises obtaining an available bandwidth of the guard band, and adjusting the numerology based on the available bandwidth of the guard band. For example, the guard band may have a configurable bandwidth that is approximately 10% or more of the total channel bandwidth of the carrier associated therewith. Thus, a subcarrier spacing or other characteristic of the numerology of carrier C2 may be adjusted to accommodate for the bandwidth of the guard band.

In another exemplary embodiment, a processing node within system 100 that is communicatively coupled to, for instance, donor access node 110 or relay node 130 can be configured to perform operations including determining that relay node 130 is unable to connect to default backhaul carrier C2. The default backhaul carrier C2 is configured to utilize a channel size that meets a threshold channel size. The operations further include identifying an available guard band to which the relay node 130 can connect. The available guard band may be associated with one or more carriers deployed by donor access node 110. The one or more carriers (including one or both of carriers C1 and C2) can have channel sizes that meet the threshold channel size. The operations can further include instructing the relay node 130 to attempt a connection to the available guard band. The connection can be enabled by defining a communication channel on the guard band, and instructing the relay node 130 to attempt a connection to the communication channel. In an exemplary embodiment, the communication channel includes a 5G communication channel, and the operations further include determining a subcarrier spacing for the communication channel that enables the relay node 130 to communicate with the donor access node 110 via the 5G communication channel. Other aspects of the numerology of the communication channel can be adjusted to enable the relay node 130 to attach to the communication channel in the guard band, such as a number of slots, a number of symbols per slot, a frame configuration of uplink and downlink slots per subframe, and configuring different bandwidth parts (BWPs) with different numerologies.

Further, in an exemplary embodiment, the default backhaul carrier is among the one or more carriers, and the available guard band is on either side of the default backhaul carrier, such as carrier C2. Alternatively or in addition, the available guard band is associated with another carrier from the one or more carriers such as carrier C2. In some exemplary embodiments, the operations further include instructing the relay node 130 to prioritize attempting the connection to the guard band of carrier C2 over attempting to attach to other backhaul carriers such as carrier C1.

Access node 110 can be any network node configured to provide communication between wireless devices 150, 160 and communication network 101, including standard access nodes such as a macro-cell access node, base transceiver station, a radio base station, an eNodeB device, an enhanced eNodeB device, a next generation or gigabit NodeB device (gNBs) in 5G networks, or the like. In an exemplary embodiment, a macro-cell access node can have a coverage area in the range of approximately five kilometers to thirty-five kilometers and an output power in the tens of watts. Further, relay node 130 may comprise any combination of a relay wireless device capable of communicating over wireless backhaul 135, and a small-cell access node capable of deploying a wireless air interface for wireless devices 160. Relay node 130 may comprise any short range, low power, small-cell access nodes such as a microcell access node, a picocell access node, a femtocell access node, or a home eNodeB device.

Access node 110 and relay node 130 can comprise a processor and associated circuitry to execute or direct the execution of computer-readable instructions to perform operations such as those further described herein. Briefly, access node 110 and relay node 130 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 and relay node 130 can receive instructions and other input at a user interface. Access node 110 communicates with gateway node 102 and controller node 104 via communication links 106, 107. Access node 110 and relay node 130 may communicate with each other, and other access nodes (not shown), using a wireless link or a wired link such as an X2 link. Components of exemplary access nodes 110, relay nodes 130, and processing nodes coupled thereto, are further described with reference to FIGS. 2-5.

Wireless devices 150, 160 may be any device, system, combination of devices, or other such communication platform capable of communicating wirelessly with access node 110 and/or relay node 130 using one or more frequency bands deployed therefrom. Each of wireless devices 150, 160 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 150, 160. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communication links 106, 107 may include S1 communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to elements within system 100, such as presence and location of access node 110 and relay node 130, device capabilities of wireless devices such as wireless devices 150, 160, bandwidth and numerology information related to carriers C1, C2, and so on. This information may be requested by or shared with access node 110 via communication links 106, 107, X2 connections, and so on. The software comprises computer programs, firmware, or some other form of machine-readable instructions, and may include an operating system, utilities, drivers, network interfaces, applications, or some other type of software, and combinations thereof. For example, a processing node within controller node 104 can perform the operations described herein. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Figure 2:
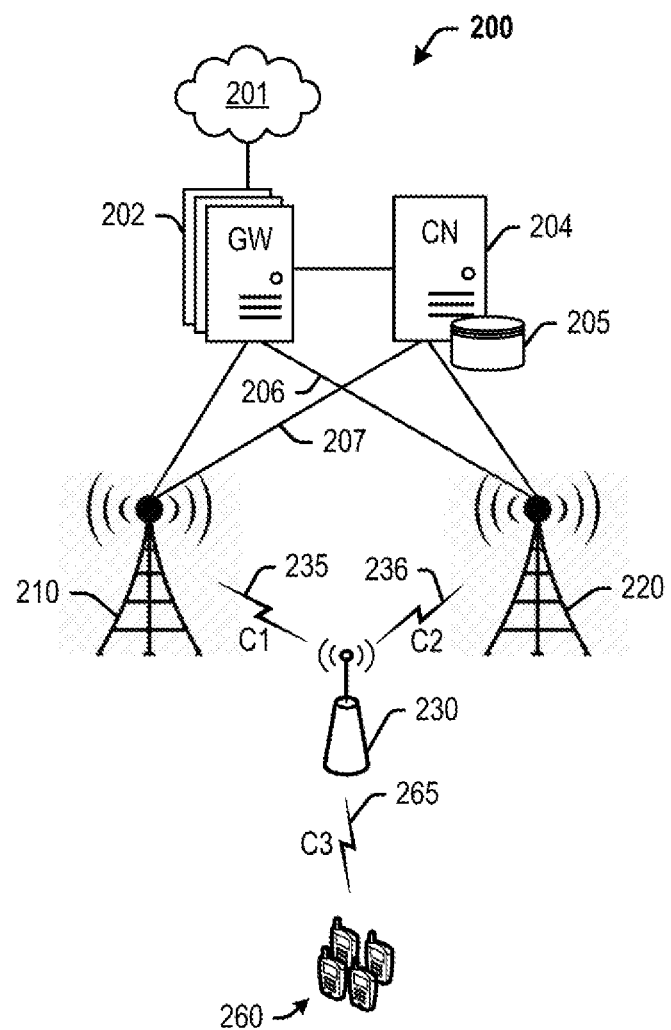
FIG. 2 depicts another exemplary system for selecting a backhaul carrier for a relay node.

FIG. 2 depicts another system 200 for selecting a backhaul carrier for a relay node. System 200 comprises components that are similar to system 100, such as a communication network 201, gateway 202, controller node 204, access node 210, relay node 230, and end-user wireless devices 260. In this exemplary embodiment, system 200 also includes a second access node 220. Similar to access nodes 110 and 210, access node 220 may be a macrocell access node configured to deploy one or more carriers C1 and C2. Each carrier C1 and C2 may be configured to utilize a different frequency band or sub-band, a different operating mode such as 4G LTE or 5G NR, a different channel size or bandwidth, and so on. Furthermore, carriers C1 and C2 may be deployed using different types of multiplexing modes, such as FDD, TDD, etc. In other embodiments, any other combination of macrocell access nodes, relay nodes, and carriers deployed therefrom may be evident to those having ordinary skill in the art in light of this disclosure.

Further, in this embodiment, relay node 230 is illustrated as being in direct communication with either access node 210 over a communication link 235 utilizing carrier C1, or with access node 220 over a communication link 236 utilizing carrier C2. Communication links 235, 236 may hereinafter be referred to as backhaul links. Further, relay node 230 may be configured to deploy another carrier C3, which may utilize the same or different frequency, operating mode, or channel bandwidth than carriers C1 or C2. Thus, wireless devices 260 are illustrated as being in direct communication with relay node 230 over communication links 265 utilizing carrier C3, with relay node 230 being configured to relay data packets between wireless devices 260 and one or both of access nodes 210, 220. Consequently, access nodes 210, 220 may be termed "donor" access nodes. Thus, wireless devices 260 may access network services using the combination of relay node 230 and wireless backhaul links 235, 236 rather than directly connecting to (and potentially overloading) donor access nodes 210, 220, which may be serving numerous other devices (not shown). Moreover, wireless devices among wireless devices 260 that are outside a coverage area of donor access nodes 210, 220 may access network services from donor access nodes 210, 220 by virtue of being connected to relay node 230.

Further, as described herein, a processing node communicatively coupled to one or more of access nodes 210, 220, and relay node 230 may be configured to select a backhaul carrier for relay node 230, when a primary, preferred, or default carrier (for example, carrier C1) becomes unavailable for any reason. For example, if it is determined that relay node 230 is disconnected from backhaul link 235 and is unable to attach to carrier C1 for any reason, then relay node 230 is instructed to attempt to attach to a guard band associated with a carrier that shares a characteristic of the preferred or default backhaul link 235. The characteristic of carrier C1 (on which backhaul link 235 was configured) can include a channel size threshold. For example, carrier C2 may be configured with a channel size that meets or exceeds a minimum channel size threshold, enabling a minimum quality of service for the plurality of end-user wireless devices 260 attached to the relay node 230. In an exemplary embodiment, the minimum channel size threshold comprises 20 MHz. Thus, the guard band of a 20 MHz channel can generally provide greater bandwidth than a guard band of a carrier with a more narrow bandwidth, such as 10 MHz or 5 MHz. For example, carrier C2 may be configured with a narrow channel bandwidth, such as 5 MHz. Consequently, instructing the relay node 230 to attempt to attach to the guard band associated with a carrier that shares the characteristic of the preferred backhaul carrier comprises instructing the relay node 230 to attempt to attach to the guard band of a carrier that utilizes a channel size that meets the channel size threshold. In other words, when the relay node 230 is disconnected from the default backhaul link 235 for any reason, the relay node 230 is instructed to attempt to attach to a guard band of any carrier having a channel size that meets or exceeds the minimum channel size threshold. In an exemplary embodiment, carrier C2 may be configured with a 20 MHz channel size, in which case the relay node 230 can reattach to a guard band of the carrier C2 prior to attempts to attach to any other carrier (including carriers C1, C2 in general). Such an instruction can include instructing the relay node 230 to scan for the guard bands of carriers C2 and C1 prior to scanning for the carrier C2.

Further, the characteristic of the default backhaul link 235 can include a threshold frequency. In other words, a frequency utilized by the carrier C1 is sufficient to provide a minimum quality of service for plurality of wireless devices 260 attached to the relay node 230. Such high frequencies are useful, for example, in densely populated areas, where relay nodes are more likely to be deployed. In this embodiment, instructing the relay node 230 to attempt to attach to the guard band associated with a carrier that shares the characteristic of carrier C1 can include instructing the relay node 230 to attempt to attach to the guard band of a carrier that utilizes a frequency above the threshold frequency. In other words, when the relay node 230 is disconnected from the default backhaul link 235 for any reason, the relay node 230 is instructed to attempt to attach to a guard band of any carrier utilizing a frequency that meets or exceeds the minimum frequency threshold. In an exemplary embodiment, the minimum frequency threshold is 2.5 GHz. Further, in an exemplary embodiment, the relay node 230 can reattach to a guard band of the default carrier itself, e.g. carrier C1. In another exemplary embodiment, the relay node can attach to a guard band of another carrier that also utilizes an above-threshold frequency. For example, if carrier C2 was configured to utilize a frequency of at least 2.5 GHz, then relay node 230 is instructed to scan for a guard band of carrier C2 prior to scanning for any other carrier or guard band. Thus, a backhaul link 236 may be set up on a guard band of carrier C2 deployed by donor access node 220.

Further, as described with reference to FIG. 1, a numerology of a communication channel within the guard band may be adjusted to enable the relay node 230 to communicate with donor access nodes 210, 220 using the guard band. For example, in a 5G NR system, adjusting a numerology of a backhaul link 236 on carrier C2 can include adjusting a subcarrier spacing, a number of slots, a number of symbols per slot, a frame configuration of uplink and downlink slots per subframe, and configuring different bandwidth parts (BWPs) with different numerologies.

Further, the methods, systems, devices, networks, access nodes, and equipment described above may be implemented with, contain, or be executed by one or more computer systems and/or processing nodes. The methods described above may also be stored on a non-transitory computer readable medium. Many of the elements of communication systems 100, 200 may be, comprise, or include computers systems and/or processing nodes. This includes, but is not limited to: access nodes 110, 210, controller nodes 104, 204, relay nodes 130, 230 and/or networks 101, 201.

Figure 3:
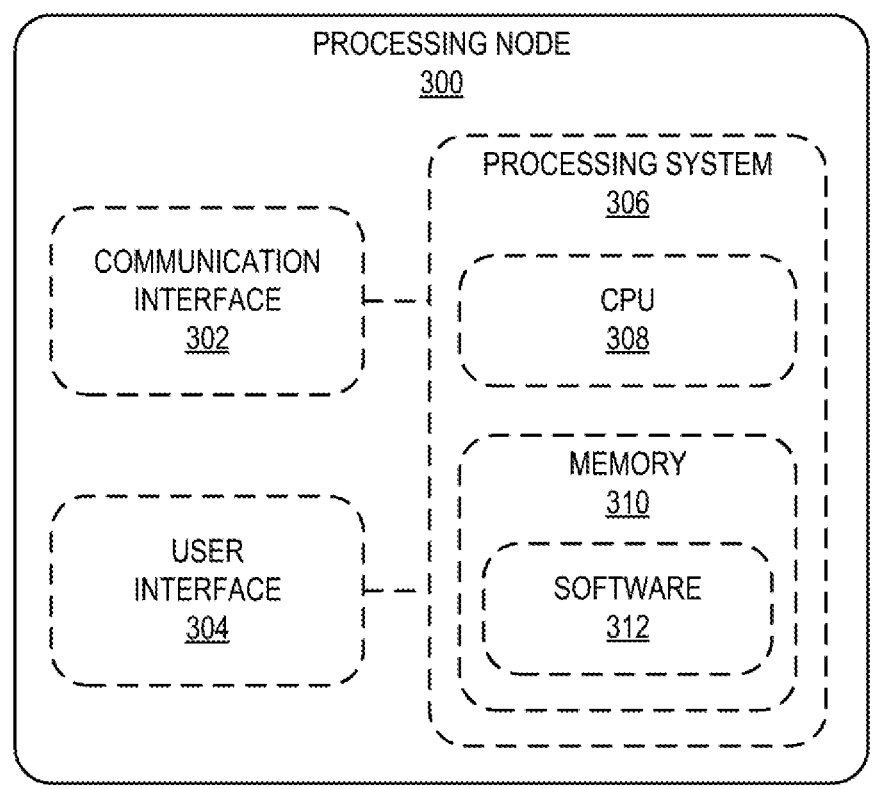
FIG. 3 depicts an exemplary processing node.

FIG. 3 depicts an exemplary processing node 300 for mitigating interference. Processing node comprises a communication interface 302, user interface 304, and processing system 306 in communication with communication interface 302 and user interface 304. Processing system 306 includes a central processing unit (CPU) 308, and a memory 310, which can comprise a disk drive, flash drive, memory circuitry, or other memory device. Memory 310 can store computer programs, firmware, or some other form of machine-readable instructions, including an operating system, utilities, drivers, network interfaces, applications, or some other type of software. Further, memory 310 can store a software 312, which may be executed to perform the interference mitigation operations described herein. Processing system 306 may include other circuitry to retrieve and execute software 312 from memory 310. Processing node 300 may further include other components such as a power management unit, a control interface unit, etc., which are omitted for clarity. Communication interface 302 permits processing node 300 to communicate with other network elements. User interface 304 permits the configuration and control of the operation of processing node 300.

Figure 4:
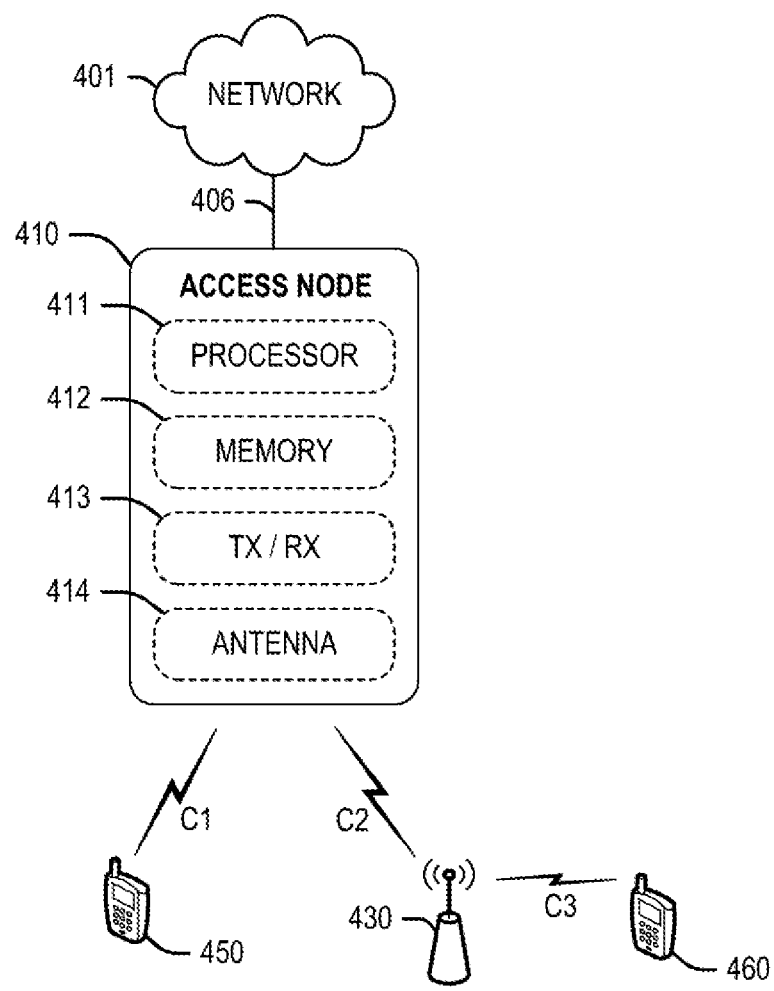
FIG. 4 depicts an exemplary access node.

FIG. 4 depicts an exemplary access node 410. Access node 410 may comprise, for example, a macro-cell access node, such as access node 110 described with reference to FIG. 1. Access node 410 is illustrated as comprising a processor 411, memory 412, transceiver 413, and antenna 414. Processor 411 executes instructions stored on memory 412, while transceiver 413 and antenna 414 enable wireless communication with wireless device 450 and relay node 430. Instructions stored on memory 412 can include deploying a carrier C1 to which wireless device 450 can attach, enabling wireless device 450 to access network services directly, and deploying a carrier C2 to which relay node 430 can attach to relay data packets to and from wireless device 460. Thus, access node 410 may be referred to as a donor access node. Access node 410 may further be configured to perform operations disclosed herein, including selecting a backhaul carrier for relay node 430 by determining that the relay node 430 is unable to attach to a preferred backhaul carrier deployed by access node 410, and instructing the relay node 430 to attempt to attach to a guard band associated with a carrier that shares a characteristic of the preferred backhaul carrier. The characteristic of the default backhaul carrier (e.g. carrier C2) can include a channel size threshold, such that when the relay node 430 is disconnected from the default carrier C2 for any reason, the relay node is instructed to attempt to attach to a guard band of any carrier having a channel size that meets or exceeds the minimum channel size threshold. Further, the characteristic of the default backhaul carrier can include a threshold frequency, such that when the relay node is disconnected from the default carrier C2 for any reason, the relay node is instructed to attempt to attach to a guard band of any carrier utilizing a frequency that meets or exceeds the minimum frequency threshold. Further, the characteristic can include a duplexing or operating mode of the carrier, such as TDD or FDD, such that when the relay node is disconnected from carrier C2 (which can be a TDD carrier), the relay node attempts to attach to a guard band of any other TDD carrier over other carriers.

In another exemplary embodiment, access node 410 can be configured to perform operations including determining that relay node 430 is unable to connect to default backhaul carrier C2, identifying an available guard band to which the relay node 430 can connect (e.g. a guard band of carrier C1), and instructing the relay node to attempt a connection to the available guard band. The connection can be enabled by defining a communication channel on the guard band of carrier C1, and instructing the relay node 430 to attempt a connection to the communication channel. In an exemplary embodiment, the communication channel includes a 5G communication channel, and the operations further include determining a subcarrier spacing for the communication channel that enables the relay node 430 to communicate with the donor access node 410 via the 5G communication channel. Other aspects of the numerology of the communication channel can be adjusted to enable the relay node 430 to attach to the communication channel in the guard band of carrier C1.

In another exemplary embodiment, access node 410 can be configured to perform operations including identifying an available guard band to which relay node 430 can connect, the available guard band being associated with one or more carriers C1 and C2, the one or more carriers having channel sizes that meet a threshold channel size, and instructing the relay node 430 to prioritize attempts to attach to the available guard band over attempts to attach to the carriers C1 and/or C2 itself. Thus, upon being unable to connect to a preferred carrier (e.g. C2) for any reason, the relay node 430 attempts to connect to the available guard band prior to attempting to connect to any of the other carriers (e.g. C1).

Figure 5:
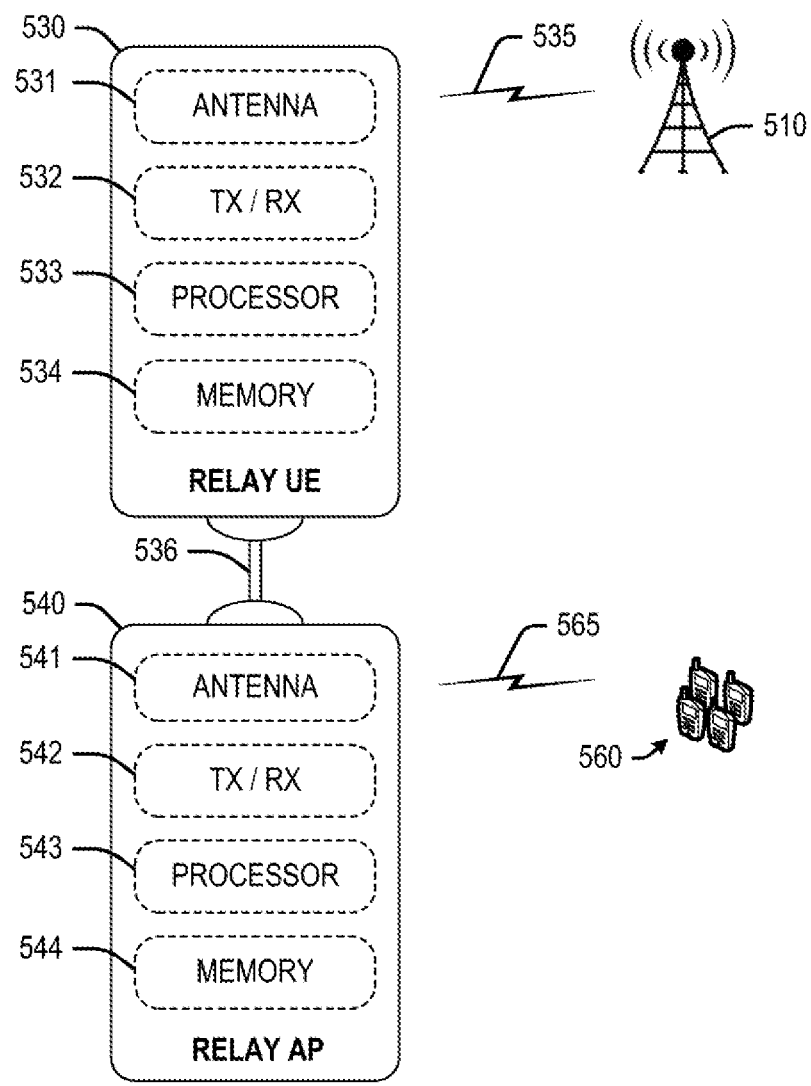
FIG. 5 depicts an exemplary relay node comprising a relay wireless device and a relay access point.

FIG. 5 depicts an exemplary relay node comprising a relay wireless device 530 and a relay access point (AP) 540. Relay wireless device 530 is illustrated as comprising an antenna 531 for direct (i.e. unrelayed) communication with donor access node 510 via wireless backhaul link 535, a transceiver 532, a processor 533, and a memory 534 for storing instructions that enable relay wireless device 530 to perform operations described herein. In some embodiments, relay wireless device 530 is referred to as a customer premise equipment (CPE), which includes any stationary LTE or 5G NR wireless device having a stronger computational & RF capability versus standard wireless devices, as well as a directional antenna and a dedicated power supply, enabling relay wireless device 530 to efficiently provide resources to wireless devices 560 via relay access point 540. Consequently, relay access point 540 may be co-located with relay wireless device 530, and is connected to relay wireless device 530 via a communication interface 536. Communication interface 536 may be any interface that enables direct communication between relay wireless device 530 and relay access point 540, such as USB, FireWire, Ethernet, or any other serial, parallel, analog, or digital interface.

In operation, relay wireless device 530 may be configured to relay network services from donor access node 510 to wireless device 560 via relay access point 540. Relay wireless device 530 may begin to function as a relay wireless device by sending a message to donor access node 510 to indicate to donor access node 510 that wireless device 530 is functioning as a relay wireless device. In some embodiments, relay wireless device 530 can request to send a buffer status report to donor access node 510. Donor access node 510 can grant this request in a conventional manner. Relay wireless device 530 may respond to the grant by sending a short buffer status report. This short buffer status report is associated with a logical channel group that indicates the buffer status report is communicating the status of relay wireless device 530 as a relay, and thus is not asking for additional resource allocations (like a 'conventional' buffer status report would indicate). In other words, when relay wireless device 530 responds with a buffer status report for the 'special' logical channel group, it means that the buffer status report is not actually reporting the status of a buffer. Rather, this buffer status report indicates that the wireless device is now functioning as a relay. Once status of relay wireless device 530 is established, relay wireless device 530 may instruct relay access point 540 to start accepting connection requests from one or more wireless devices such as wireless device 360. Further, relay access point 540 is illustrated as comprising an antenna 541 and transceiver 542 for enabling communication with wireless device 560, processor 543, and a memory 544 for storing instructions that are executed by processor 543. In some embodiments, relay access point 540 may be a home eNodeB. Moreover, although only one transceiver is depicted in each of relay wireless device 530 and relay access point 540, additional transceivers may be incorporated in order to facilitate communication across interface 526 and other network elements.

Further, based on the indication of relay status, donor access node 510 may alter how relay wireless device 530 is treated. For example, relay wireless device 530 may be provided with preferential treatment because it is functioning as a relay. In an exemplary embodiment, a specific class indicator is assigned to wireless backhaul link 535 between relay wireless device 530 and donor access node 510. The class indicator may be a QCI that is different from other QCIs assigned to wireless devices that are directly connected to donor access node 510. In other embodiments (and as described herein), upon being disconnected and/or being unable to connect to a preferred carrier, relay wireless device 530 may be instructed to attempt to connect to a guard band of a carrier that has similar characteristics to the preferred carrier. For example, the characteristics can include a threshold channel bandwidth size, a threshold frequency, a TDD operating mode, etc.

Figure 6:
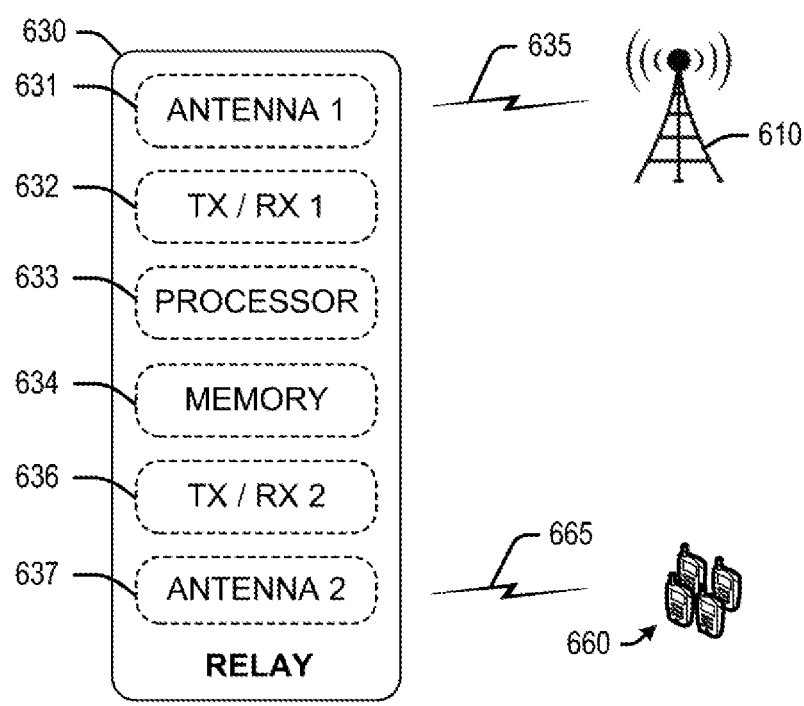
FIG. 6 depicts another exemplary relay node combining a relay wireless device and a relay access point.

In another exemplary embodiment, the relay node may integrate components of both relay wireless device 530 and relay access point 540 into a single unit. FIG. 6 depicts an exemplary relay node 630 of this type. Relay node 630 is illustrated as comprising an antenna 631 for direct (i.e. unrelayed) communication with donor access node 610 via wireless backhaul link 635, a transceiver 632, a processor 633, and a memory 634 for storing instructions that are executed by processor 622 as described herein. Relay node 630 further includes another transceiver 636 and antenna 637 for enabling communication with wireless device 660. Relay node 620 can perform operations similar to those described above with respect to FIG. 5.

In an embodiment, the relay nodes depicted in FIGS. 5-6 can be configured to function as one or more of a layer 1 (L1), layer 2 (L2), or layer 3 (L3) relay. A layer 1 relay functions as a booster or repeater. In other words, a layer 1 relay node performs an amplify and forward (AF) function. RF signals received from a donor access node are amplified and transmitted to end-user wireless devices. Likewise, RF signals received from end-user wireless devices are amplified and transmitted to donor access nodes. Alternatively or in addition, a layer 2 relay node performs a decode and forward (DF) function. RF signals received from a donor access node are demodulated and decoded, then encoded and modulated again before being transmitted to a wireless device. Likewise, RF signals received from a wireless device are demodulated and decoded, then encoded and modulated again before being transmitted to a donor access node. Alternatively or in addition, a layer 3 relay node also performs a decode and forward function. However, a layer 3 relay node also performs additional processing (such as ciphering and/or data concatenation/segmentation/reassembly). In other words, relay node depicted herein performs demodulation and decoding of the received RF signals (either uplink or downlink), processes received data, then encodes, modulates, and transmits the data to a wireless device.

Figure 7:
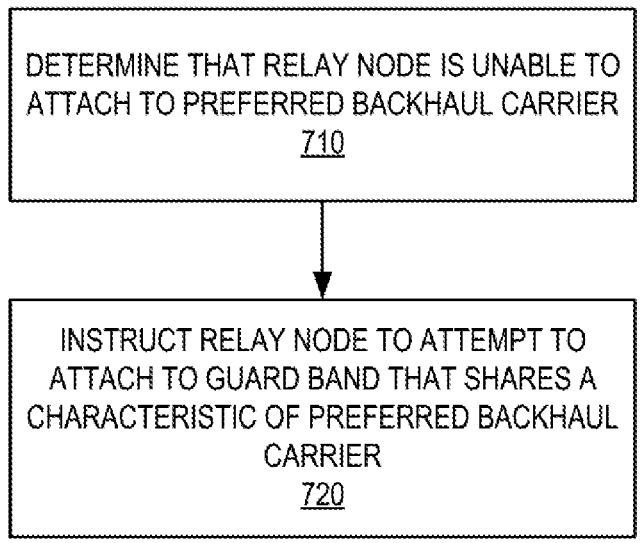
FIG. 7 depicts an exemplary method for selecting a backhaul carrier for a relay node.

FIG. 7 depicts an exemplary method for selecting a backhaul carrier for a relay node. The method of FIG. 7 may be implemented by a processing node (such as processing node 300) communicatively coupled to one or more of a relay node or a donor access node, by a controller node, or by any other network node. Although FIG. 7 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 710, it is determined that a relay node is unable to attached to a preferred backhaul carrier. The preferred or default carrier may be deployed by one or more access nodes within a communication range of the relay node. For example, an access node deploying the default carrier may be a macrocell access node, such as an eNodeB. Further, the relay node can be configured to relay data between the access node and one or more end-user wireless devices attached to the relay node. Thus, the relay node may be a small cell access node, a home eNodeB, etc. In an exemplary embodiment, the relay node includes a relay wireless device coupled to a relay access point, and is configured to relay data packets between the access node and an end-user wireless device attached to the relay access point. Thus, the access node may be referred to as a donor access node. As described herein, the relay node may be disconnected from the default carrier and unable to reattach for any reason, including a low signal level of the default carrier, a high load on the default carrier, or disabling of the default carrier.

At 720, the relay node is instructed to attempt to attach to a guard band associated with a carrier that shares a characteristic of the preferred backhaul carrier. The characteristic of the default backhaul carrier can include a channel size threshold. In other words, the default or preferred backhaul carrier is configured with a channel size that meets or exceeds a minimum channel size threshold, enabling a minimum quality of service for the plurality of end-user wireless devices attached to the relay node. In an exemplary embodiment, the minimum channel size threshold comprises 20 MHz. Thus, the guard band of a 20 MHz channel can generally provide greater bandwidth than a guard band of a carrier with a more narrow bandwidth, such as 10 MHz or 5 MHz. Consequently, instructing the relay node to attempt to attach to the guard band associated with a carrier that shares the characteristic of the preferred backhaul carrier comprises: instructing the relay node to attempt to attach to the guard band of a carrier that utilizes a channel size that meets the channel size threshold. In other words, when the relay node is disconnected from the default carrier for any reason, the relay node is instructed to attempt to attach to a guard band of any carrier having a channel size that meets or exceeds the minimum channel size threshold. In an exemplary embodiment, the relay node can reattach to a guard band of the default carrier itself. In other words, when the relay node is unable to connect or reconnect to the default carrier, the relay node attempts to attach to the guard band of the default carrier prior to attempts to attach to any other carrier. In another exemplary embodiment, the relay node can attach to a guard band of another carrier that also has a sufficiently-large channel size, prior to attempts to attach to any other carrier.

Further, the characteristic of the default backhaul carrier can include a threshold frequency. In other words, a frequency utilized by the default backhaul carrier is sufficient to provide a minimum quality of service for a plurality of wireless devices attached to the relay node. Such high frequencies are useful, for example, in densely populated areas, where relay nodes are more likely to be deployed. In this embodiment, instructing the relay node to attempt to attach to the guard band associated with a carrier that shares the characteristic of the preferred backhaul carrier can include instructing the relay node to attempt to attach to the guard band of a carrier that utilizes a frequency above the threshold frequency. In other words, when the relay node is disconnected from the default carrier for any reason, the relay node is instructed to attempt to attach to a guard band of any carrier utilizing a frequency that meets or exceeds the minimum frequency threshold. In an exemplary embodiment, the relay node can reattach to a guard band of the default carrier itself. In another exemplary embodiment, the relay node can attach to a guard band of another carrier that also utilizes an above-threshold frequency. In another exemplary embodiment, the relay node can be instructed to attach to a guard band of any TDD carrier over a guard band of any other carrier.

Figure 8:
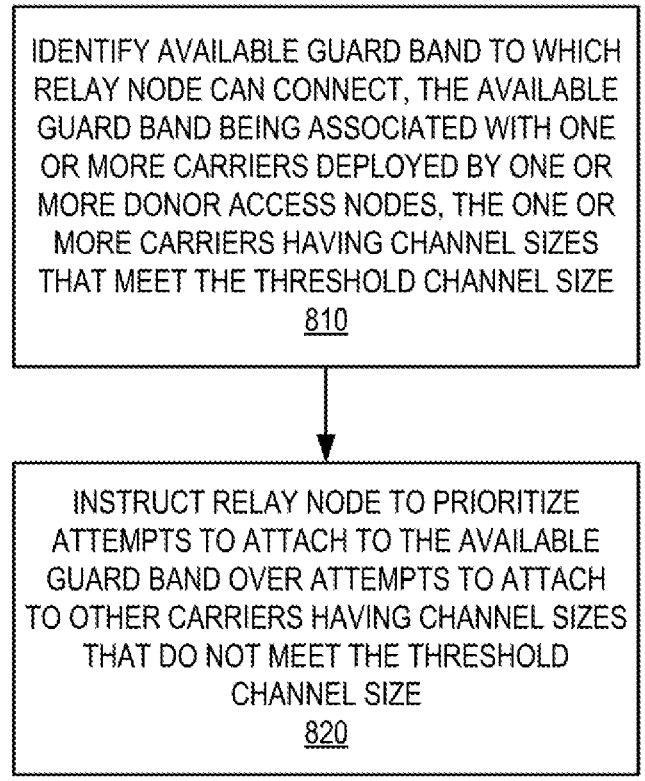
FIG. 8 depicts another exemplary method for selecting a backhaul carrier for a relay node.

FIG. 8 depicts another exemplary method for selecting a backhaul carrier for a relay node. The method of FIG. 8 may be implemented by a processing node (such as processing node 300) communicatively coupled to one or more of a relay node or a donor access node, by a controller node, or by any other network node. Although FIG. 8 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 810, an available guard band to which a relay node can connect is identified. The available guard band can be associated with one or more carriers deployed by one or more donor access nodes. For example, an access node deploying the default carrier may be a macrocell access node, such as an eNodeB. Further, the relay node can be configured to relay data between the access node and one or more end-user wireless devices attached to the relay node. Thus, the relay node may be a small cell access node, a home eNodeB, etc. In an exemplary embodiment, the relay node includes a relay wireless device coupled to a relay access point, and is configured to relay data packets between the access node and an end-user wireless device attached to the relay access point. Thus, the access node may be referred to as a donor access node. Further, the one or more carriers may be configured to utilize channel sizes that meet a threshold channel size.

At 820, the relay node is instructed to prioritize attempts to attach to the available guard band over attempts to attach to other carriers having channel sizes that do not meet the threshold channel size. For example, the relay node may be disconnected from the default carrier and unable to reattach for any reason, including a low signal level of the default carrier, a high load on the default carrier, or disabling of the default carrier. Upon being unable to connect to a preferred carrier for any reason, the relay node attempts to connect to the available guard band prior to attempting to connect to any of the other carriers. In an exemplary embodiment, the minimum channel size threshold comprises 20 MHz. Thus, the guard band of a 20 MHz channel can generally provide greater bandwidth than a guard band of a carrier with a more narrow bandwidth, such as 10 MHz or 5 MHz. Consequently, when the relay node is disconnected from the default carrier for any reason, the relay node is instructed to attempt to attach to a guard band of any carrier having a channel size that meets or exceeds the minimum channel size threshold. In an exemplary embodiment, the relay node can reattach to a guard band of the default carrier itself. In other words, when the relay node is unable to connect or reconnect to the default carrier, the relay node attempts to attach to the guard band of the default carrier prior to attempts to attach to any other carrier. In another exemplary embodiment, the relay node can attach to a guard band of another carrier that also has a sufficiently-large channel size, prior to attempts to attach to any other carrier. The instructions can further include instructing a donor access node to deploy a communication channel on the available guard band to which the relay node can attach. For example, the communication channel can be a 5G communication channel with a flexible numerology, as described herein.

Figure 9:
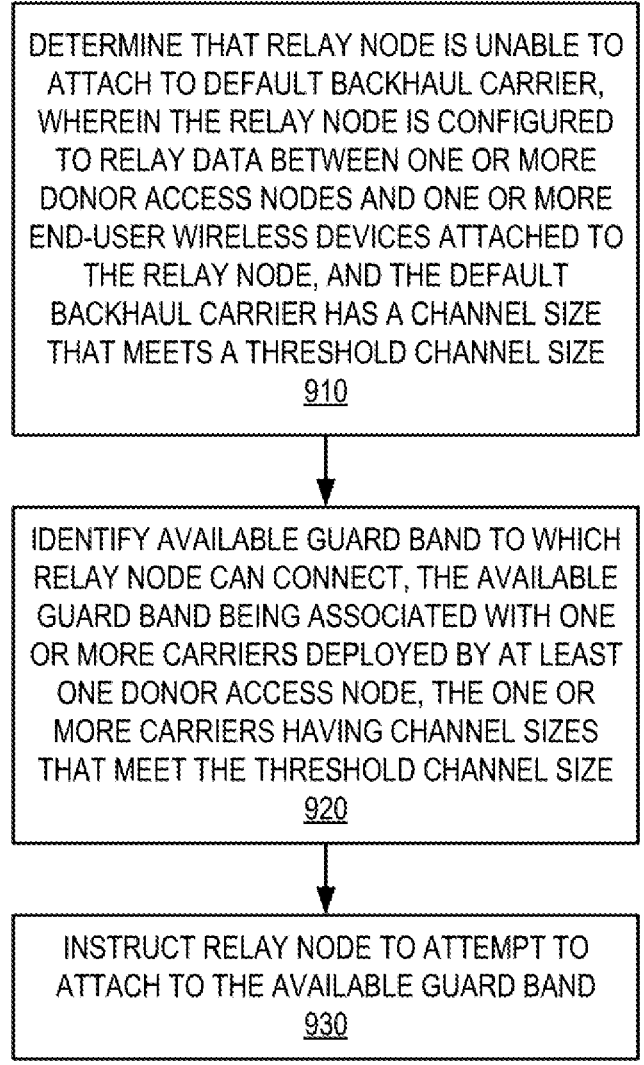
FIG. 9 depicts another exemplary method for selecting a backhaul carrier for a relay node.

FIG. 9 depicts an exemplary method for selecting a backhaul carrier for a relay node. The method of FIG. 9 may be implemented by a processing node (such as processing node 300) communicatively coupled to one or more of a relay node or a donor access node, by a controller node, or by any other network node. Although FIG. 9 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 910, it is determined that a relay node is unable to attached to a preferred backhaul carrier. The preferred or default carrier may be deployed by one or more access nodes within a communication range of the relay node. For example, an access node deploying the default carrier may be a macrocell access node, such as an eNodeB. Further, the relay node can be configured to relay data between the access node and one or more end-user wireless devices attached to the relay node. Thus, the relay node may be a small cell access node, a home eNodeB, etc. In an exemplary embodiment, the relay node includes a relay wireless device coupled to a relay access point, and is configured to relay data packets between the access node and an end-user wireless device attached to the relay access point. Thus, the access node may be referred to as a donor access node. As described herein, the relay node may be disconnected from the default carrier and unable to reattach for any reason, including a low signal level of the default carrier, a high load on the default carrier, or disabling of the default carrier. Further, the one or more carriers may be configured to utilize channel sizes that meet a threshold channel size. The default or preferred backhaul carrier is configured with a channel size that meets or exceeds a minimum channel size threshold, enabling a minimum quality of service for the plurality of end-user wireless devices attached to the relay node. In an exemplary embodiment, the minimum channel size threshold comprises 20 MHz. Thus, the guard band of a 20 MHz channel can generally provide greater bandwidth than a guard band of a carrier with a more narrow bandwidth, such as 10 MHz or 5 MHz.

At 920, a guard band is identified to which the relay node can connect, and at 930, the relay node is instructed to attempt to attach to the guard band. Consequently, the relay node attempt to attach to the guard band of a carrier that utilizes a channel size that meets the channel size threshold. In other words, when the relay node is disconnected from the default carrier for any reason, the relay node is instructed to attempt to attach to a guard band of any carrier having a channel size that meets or exceeds the minimum channel size threshold. In an exemplary embodiment, the relay node can reattach to a guard band of the default carrier itself. In other words, when the relay node is unable to connect or reconnect to the default carrier, the relay node attempts to attach to the guard band of the default carrier prior to attempts to attach to any other carrier. In another exemplary embodiment, the relay node can attach to a guard band of another carrier that also has a sufficiently-large channel size, prior to attempts to attach to any other carrier.

Further, the connection can be enabled by defining a communication channel on the guard band, and instructing the relay node to attempt a connection to the communication channel. In an exemplary embodiment, the communication channel includes a 5G communication channel, and the operations further include determining a subcarrier spacing for the communication channel that enables the relay node to communicate with the at least one donor access node via the 5G communication channel. Other aspects of the numerology of the communication channel can be adjusted to enable the relay node to attach to the communication channel in the guard band, such as a number of slots, a number of symbols per slot, a frame configuration of uplink and downlink slots per subframe, and configuring different bandwidth parts (BWPs) with different numerologies.

Further, in an exemplary embodiment, the default backhaul carrier is among the one or more carriers, and the available guard band is on either side of the default backhaul carrier. Alternatively or in addition, the available guard band is associated with another carrier from the one or more carriers, said another carrier being different from the default backhaul carrier. In some exemplary embodiments, the operations further include instructing the relay node to prioritize attempting the connection to the guard band over attempting to attach to other backhaul carriers.

Figure 10:
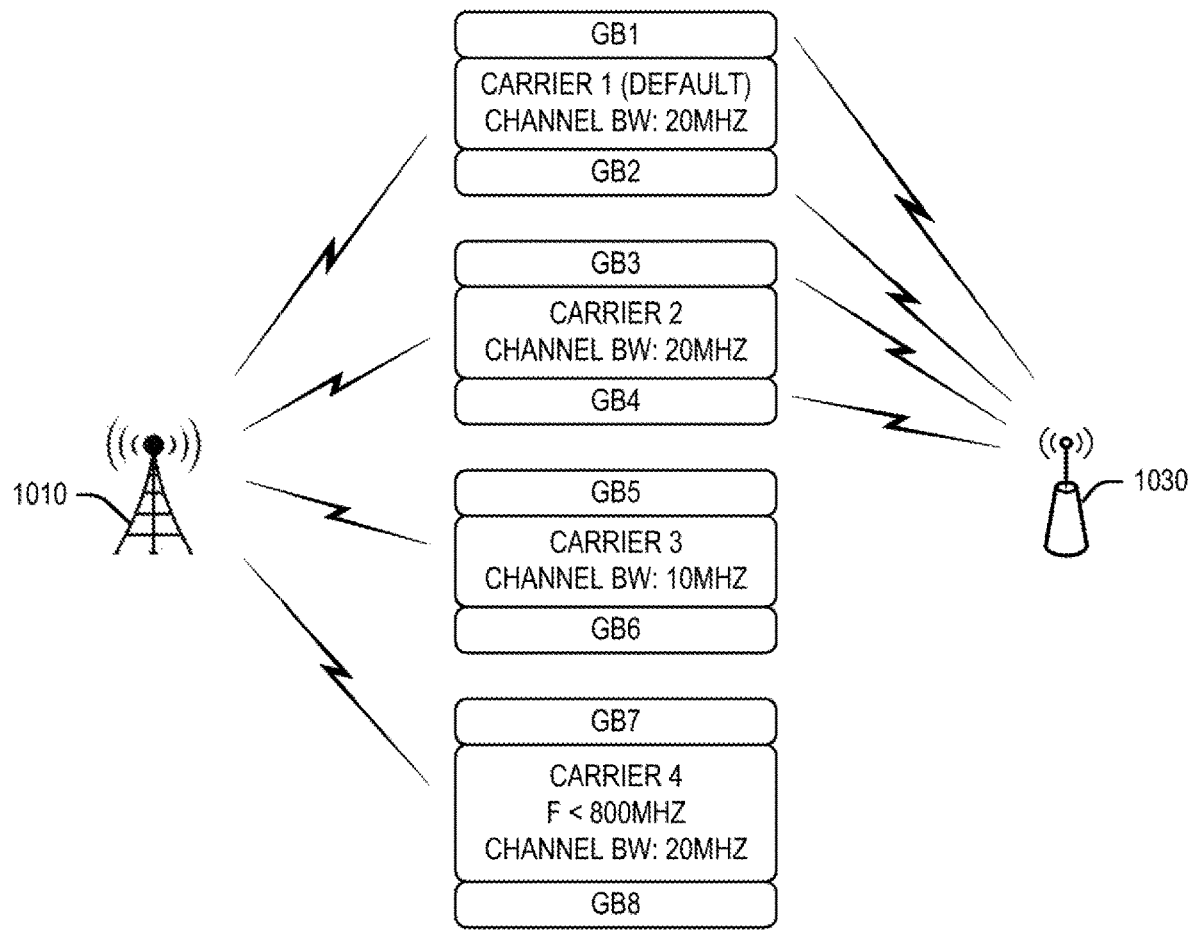
FIG. 10 depicts exemplary prioritization of backhaul carriers by a relay node.

FIG. 10 depicts exemplary prioritizing of backhaul carriers by a relay node 1030. Donor access node 1010 is configured to deploy four carriers, carrier 1, carrier 2, carrier 3, and carrier 4 (hereinafter referred to respectively as C1, C2, C3, and C4). C1 is the default carrier to which relay node 1030 is configured to attach, and is further configured with a channel bandwidth of 20 MHz and having two guard bands GB1 and GB2 on either side. C2 is configured with a channel bandwidth of 20 MHz, and has two guard bands GB3 and GB4 on either side. C3 is configured with a channel bandwidth of 10 MHz, and has two guard bands GB5 and GB6 on either side. Finally, C4 is configured with a channel bandwidth of 20 MHz, and has two guard bands GB7 and GB8 on either side. Further, C4 is configured with a frequency of less than 800 MHz, whereas it is assumed that C1-C3 are configured with frequencies of greater than 800 MHz, such as 2.5 GHz, 5 GHz, etc.

Upon being disconnected or unable to reconnect to default carrier C1 for any reason, according to the subject disclosure, relay node 1030 is instructed to attempt to attach to a guard band of any carrier that shares a characteristic of C1. For example, C2 is configured to utilize channel bandwidths of 20 MHz and, therefore, shares the characteristics of C1. Thus, relay node 1030 can prioritize attempts to connect to the guard band of C2, rather than connect to carrier C2 itself, or any other carrier. Further, relay node 1030 does not prioritize attempts to connect to guard bands GB7 or GB8 of C4, despite C4 being configured with a 20 MHz channel size, because C4 is configured to utilize a lower frequency. Similarly, relay node 1030 does not prioritize attempts to connect to guard bands GB5 or GB6 of C3, because C3 is configured to utilize a below-threshold channel bandwidth.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for selecting a backhaul carrier for a relay node, the method comprising:
    determining that the relay node is unable to attach to a preferred backhaul carrier;
    instructing the relay node to attempt to attach to a guard band associated with a carrier that shares a characteristic of the preferred backhaul carrier; and
    adjusting a numerology of a communication channel within the guard band to enable the relay node to communicate with a donor access node using the guard band.

2. The method of claim 1, wherein the relay node is configured to relay data between one or more donor access nodes and one or more end-user wireless devices attached to the relay node.

3. The method of claim 2, wherein the one or more end-user wireless devices attach to a wireless air interface deployed by the relay node.

4. The method of claim 2, wherein the preferred backhaul carrier is deployed by the one or more donor access nodes.

5. The method of claim 1, wherein the characteristic of the preferred backhaul carrier comprises a channel size threshold.

6. The method of claim 5, wherein instructing the relay node to attempt to attach to the guard band comprises instructing the relay node to attempt to attach to the guard band of a carrier that utilizes a channel size that meets the channel size threshold.

7. The method of claim 1, wherein the characteristic of the preferred backhaul carrier comprises a threshold frequency.

8. The method of claim 7, wherein instructing the relay node to attempt to attach to the guard band comprises instructing the relay node to attempt to attach to the guard band of a carrier that comprises a frequency above the threshold frequency.

9. The method of claim 1, wherein adjusting the numerology comprises obtaining an available bandwidth of the carrier associated with the guard band; and adjusting the numerology based on the available bandwidth of the carrier associated with the guard band.

10. The method of claim 9, wherein adjusting the numerology comprises selecting a subcarrier spacing that enables the relay node to communicate with the donor access node using the available bandwidth.

11. The method of claim 1, further comprising instructing the relay node to prioritize attempting to attach to the guard band of the carrier that shares the characteristic of the preferred backhaul carrier over attempting to attach to other backhaul carriers.

12. A system for selecting a backhaul carrier for a relay node, the system comprising:
a processing node; and
a processor coupled to the processing node, the processor being configured to perform operations comprising:
determining that a relay node is unable to connect to a default backhaul carrier in a wireless network, wherein the relay node is configured to relay data between one or more donor access nodes and one or more end-user wireless devices attached to the relay node, the default backhaul carrier is deployed by the one or more donor access nodes, and the default backhaul carrier has a channel size that meets a threshold channel size;
identifying an available guard band to which the relay node can connect, the available guard band being associated with one or more carriers deployed by at least one of the one or more donor access nodes, the one or more carriers having channel sizes that meet the threshold channel size; and
instructing the relay node to attempt a connection to the available guard band.

13. The system of claim 12, wherein the operations further comprise defining a communication channel on the guard band; and instructing the relay node to attempt a connection to the communication channel.

14. The system of claim 13, wherein the communication channel comprises a 5G communication channel, and the operations further comprise determining a subcarrier spacing for the communication channel that enables the relay node to communicate with the at least one donor access node via the 5G communication channel.

15. The system of claim 12, wherein the default backhaul carrier is among the one or more carriers, and the available guard band is on either side of the default backhaul carrier.

16. The system of claim 12, wherein the available guard band is associated with another carrier from the one or more carriers, said another carrier being different from the default backhaul carrier.

17. The system of claim 12, wherein the operations further comprise instructing the relay node to prioritize attempting the connection to the guard band over attempting to attach to other backhaul carriers.

18. A processing node for selecting a backhaul carrier for a relay node, the processing node being configured to perform operations comprising:
identifying an available guard band to which a relay node can connect, the available guard band being associated with one or more carriers deployed by one or more donor access nodes, the one or more carriers having channel sizes that meet a threshold channel size; and
instructing the relay node to prioritize attempts to attach to the available guard band over attempts to attach to other carriers having channel sizes that do not meet the threshold channel size,
wherein, upon being unable to connect to a preferred carrier, the relay node attempts to connect to the available guard band prior to attempting to connect to any of the other carriers.

19. The processing node of claim 18, wherein the instructions further comprise instructing a donor access node to deploy a communication channel on the available guard band to which the relay node can attach.

* * * * *